Nov. 1, 1927.
J. A. SCHMITT
PULSATOR
Filed Oct. 4, 1921
1,647,971
2 Sheets-Sheet 1
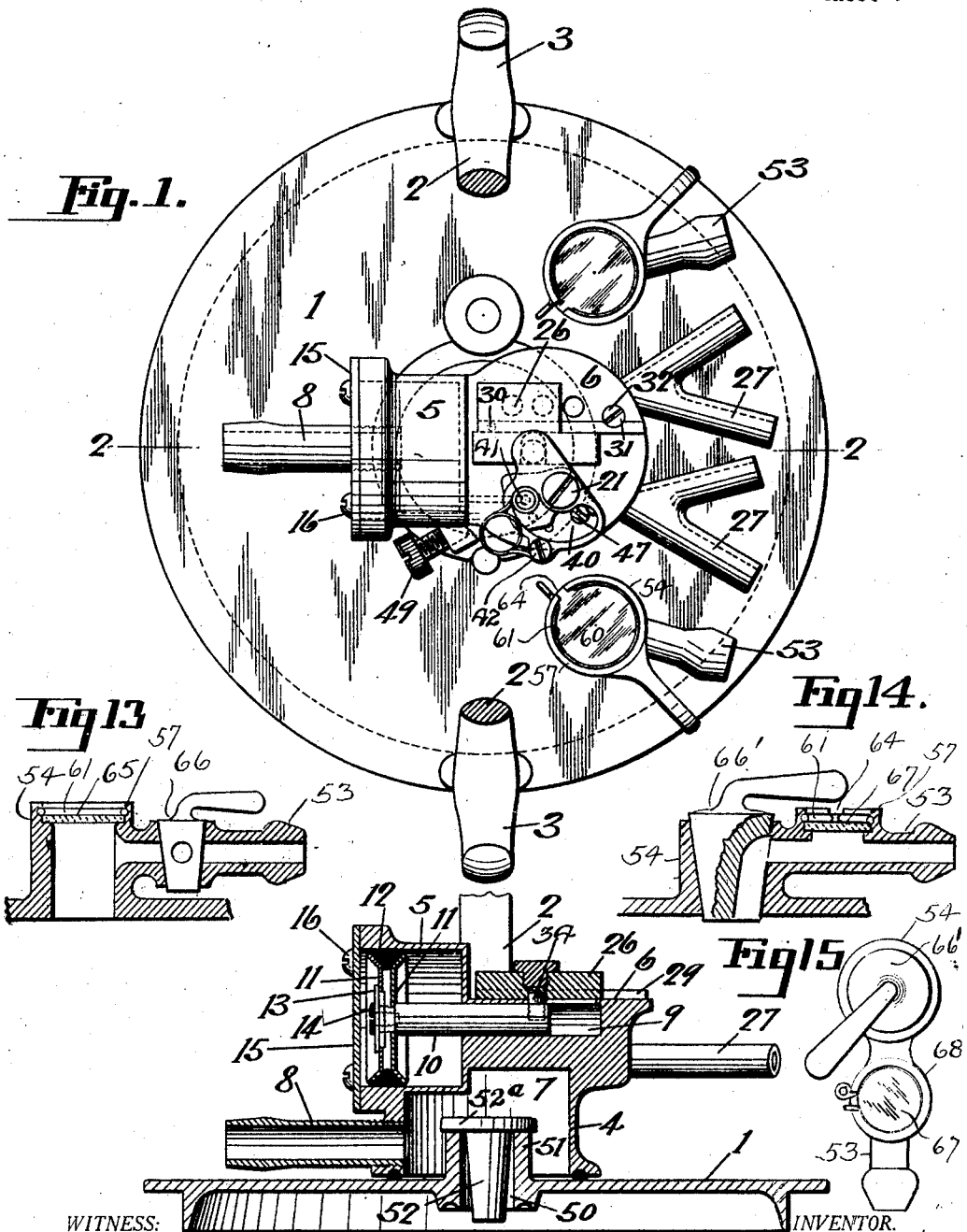

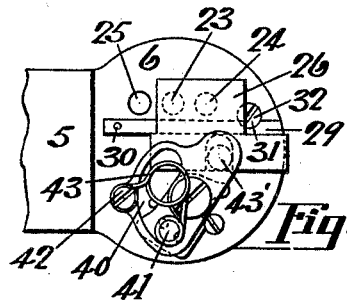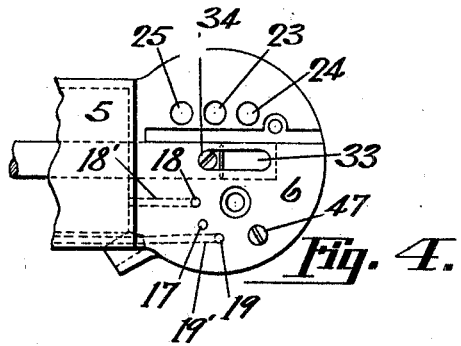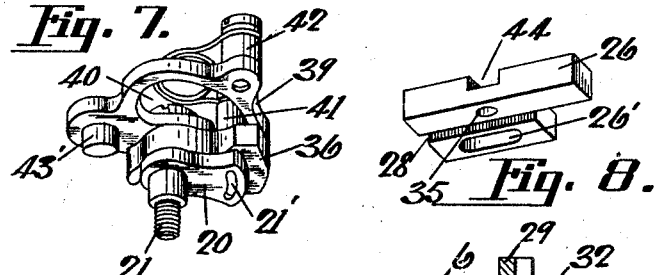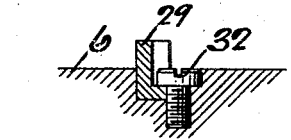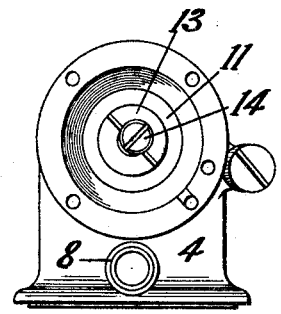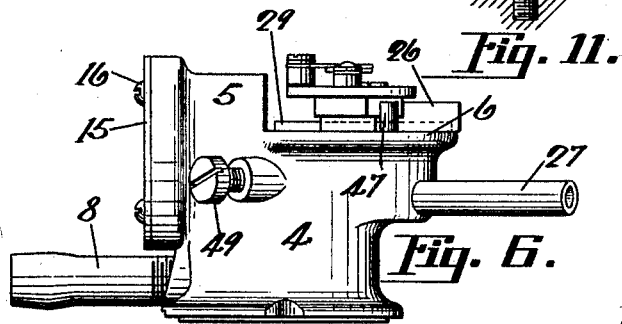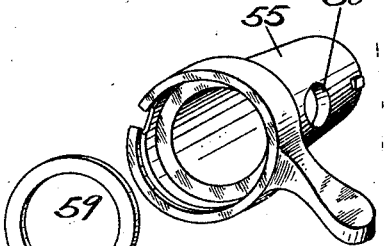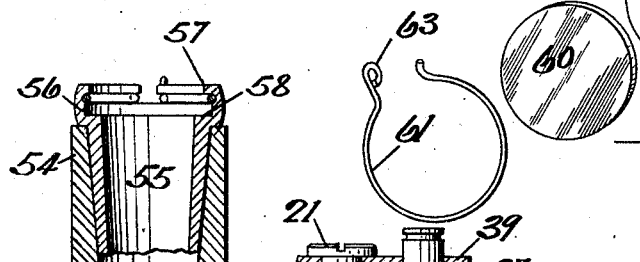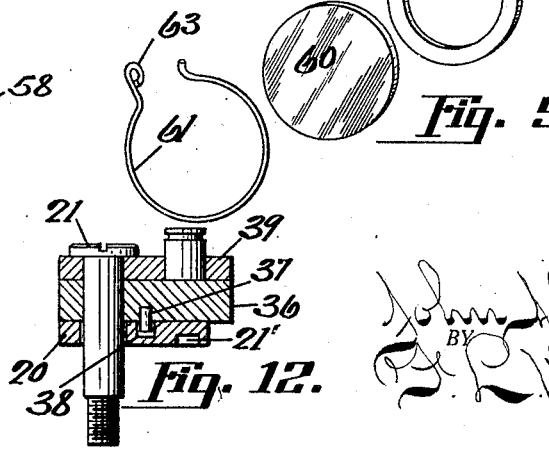

Patented Nov. 1, 1927.

1,647,971

UNITED STATES PATENT OFFICE.

JOHN ANTON SCHMITT, OF COLUMBUS, OHIO, ASSIGNOR TO THE UNIVERSAL MILKING MACHINE COMPANY, OF WAUKESHA, WISCONSIN, A CORPORATION OF WISCONSIN.

PULSATOR.

Application filed October 4, 1921. Serial No. 505,257.

My invention relates to milking apparatus and more particularly to pulsators for alternating the actuating fluid pressure to the operating mechanism and the respective groups of teat cups.

The invention contemplates a pulsator mechanism which will be small and compact having an automatic reversible control valve, which will operate with a quick snap-over movement without the necessity of locking means.

A further object of the invention is to provide an improved form of pulsator valve and interconnection between the pulsator and control valve.

A further object of the invention is to provide an improved form of actuating piston with adjustable packing collar by which wear may be compensated for and looseness of fit obviated.

A further object of the invention is to provide an improved form of check valve between the suction chamber of the pulsator and the pail or receiver and to provide indicator or observation apertures, thru which the flow of milk may be readily observed.

With the above primary and other incidental objects in view as will more fully appear in the specification, the invention consists of the features of construction, the parts and combinations thereof, and the mode of operation or their equivalents as hereinafter described and set forth in the claims.

Referring to the drawings, Fig. 1 is a top plan view of a milk receiver or pail lid upon which is mounted the pulsator forming the subject matter thereof. Fig. 2 is a transverse sectional view on line 2—2 of Fig. 1. Fig. 3 is a top plan detail view of the valve mechanism showing the valve members in reverse position or that opposite the position shown in Fig. 1. Fig. 4 is a top plan view of the valve table of the pulsator with the pulsator and control valve removed. Fig. 5 is an end elevation of the pulsator from the left in Fig. 1, with the head of the cylinder removed, disclosing the piston therein. Fig. 6 is a side elevation of the pulsator removed from the pail lid or cover and viewed from the bottom in Fig. 1. Fig. 7 is a detail perspective view of the oscillatory control valve and tripping mechanism therefor, viewed from the under side. Fig. 8 is a detail perspective view of the reciprocatory pulsator valve also viewed from the bottom. Fig. 9 is a detail perspective view of the milk valve member having the observation opening formed in the top thereof, the parts being separated or disassembled. Fig. 10 is a transverse sectional view of the assembled milk valve disclosing the relation of the parts shown in Fig. 9. Fig. 11 is a detail sectional view illustrating the mode of attachment of the gib or feather by which the reciprocatory pulsator valve is guided. Fig. 12 is a detail view.

Figs. 13, 14 and 15 are detail views of modifications of the milk spigot embodying observation areas.

Like parts are indicated by similar characters of reference throughout the several views.

Referring to the accompanying drawings, wherein is shown the preferred but obviously not necessarily the only embodiment of the invention, 1 is the pail or milk receiver top or cover, provided with the usual bail or handle 2, in the present instance, broken away and having at its opposite sides, hooks 3 for conveniently supporting the teat cup clusters when not in use. Mounted centrally upon the lid or cover 1 is the pulsator comprising the vertically disposed cylindrical chambered base 4 from which extends laterally at one side thereof, the integral short cylinder portion 5. and adjacent to the cylinder the flat table like valve bearing surface 6, which forms a top of the cylinder 4, and the bearing surface for the control and pulsator valve. The chamber 7 within the base portion 4 of the pulsator frame, comprises a suction chamber to which is connected a conduit or spud 8, communicating with any source of suction such as a vacuum tank, a pump, or other such device. The head or top of the base portion 4 beneath the valve bearing surface is provided with a transversely arranged bore 9, in which reciprocates a piston stem 10, projecting within the cylinder 5, where it is connected with a piston head to be actuated to and fro by alternation of atmospheric pressure on the opposite sides thereof. The piston head comprises two oppositely disposed tapered discs 11, between which is disposed an annular collar or ring 12 of packing material, such as leather, rubber, composition or other suitable packing substance. The annular packing member 12 is clamped between the divergent faces of the discs 11 by means of a clamp nut 13, screw threaded upon the shouldered extremity of the piston rod 10 and locked in its adjusted position by a set screw 14, threaded into the end of the stem or rod 10. By adjusting the clamp nut 13 the annular packing member 12 may be placed under greater or less compression and by the relative adjustment of the divergent faces of the disc 11, the annular packing member 12 is expanded into contact with the walls of the cylinder 5. The piston is readily accessible for accurate adjustment of the packing member by the removal of the cylinder head 15, which is detachably secured by suitable screws 16. This construction affords a very simple but efficient means by which the piston packing is readily adjustable to prevent leakage without inducing excessive friction or resistance to its reciprocatory movement.

The piston is actuated as is usual in such constructions by connecting the opposite sides of the piston alternately with atmosphere and with the suction chamber 7. To this end the valve table 6 of the pulsator is provided with a group of three ports, 17, 18 and 19. The intermediate port 17 passes downwardly through the head or top of the pulsator body and communicates at its lower end with the suction chamber 7, directly connected by the conduit or spud 8 with the source of vacuum. The port 18 is connected through a lateral passage 18' shown by dotted lines with the cylinder 5 at the inner side of the piston head. The remaining port 19 is likewise connected through a connecting passage 19' with the outer end of the cylinder 5, at the opposite side of the piston head. These ports are controlled by an oscillatory control valve 20, pivotally mounted upon a stud 21, and oscillated to and fro to alternately connect the suction port 17 with the ports 18 and 19, the disconnected port being opened to atmosphere. By this means when one end of the cylinder 5 is connected through the corresponding passage and port with the suction chamber 7, the other end of the cylinder is open to atmosphere, whereby the atmospheric pressure upon the piston head will shift the piston toward the end of the cylinder connected with the suction chamber. This movement of the piston is transmitted to the valve 20, to reverse the position of the valve, and the communication of the ports controlled thereby to admit air pressure to the opposite side of the cylinder 10 and reversing the connection of the cylinder 5 and suction chamber 7. These ports 17, 18 and 19 are the control ports and the valve 20 is the control valve. Adjacent to the opposite side of the valve table 6 is a second group of ports 23, 24 and 25, comprising the pulsator ports, which are controlled by a reciprocatory pulsator valve 26. The intermediate port 23 communicates with the suction chamber 7, while the ports 25 and 26 are each independently connected with a separate teat cup connection, in this instance a Y-connection 27. The teat cup clusters are connected with the connections 27 to be alternately actuated as the valve 26 is reciprocated to and fro. The preferable mode of connection of the teat cup is to independently connect half the cups of each of two different clusters with each connection 27. That is to say, part of the cups of one cluster are connected with one Y-connection 27 while the remaining cups of the same cluster are connected with the second Y-connection whereby the operation of the cups comprising each cluster is effected alternately.

The valve 26 is recessed on its under side as at 26' to afford an interconnecting passage between the intermediate port 23, and the respective port 25 and 24 when the valve is at the opposite limits of its stroke. That is to say, in one position of adjustment the recess 26' connects the port 25 with the suction chamber 7 thru the intermediate port 23 and in the other position of adjustment the suction chamber is connected thru the port 23 with the port 24 leading to the opposite Y-connection for the teat cup. The valve 26 is slotted or splined on its under side as at 28 for engagement over a feather or gib 29, projecting from the top surface of the valve table 6. This guide feather or gib 29 may be formed integral with the pulsator mounting, but for convenience of manufacture is preferably a separate element detachably connected in a slot or seat formed in the surface of the valve table 6. To this end the feather or gib 29 is provided adjacent to one end with a pin or stud 30, which engages a corresponding hole in the bottom of the slot or recess in which the feather or gib is seated, while adjacent to its opposite end, the feather is provided with an arcuate notch 31, in which engages the head 32 of a screw, countersunk in the valve table 6 in such position that the head of the screw extends into the notch 31 and overhangs a portion of the guide feather or gib. It is desirable that the valve table top 6 be finished with a uniform smooth surface by lapping or otherwise to insure the proper seating of the valve. This operation may be performed more economically and rapidly if the feather or gib is not present during this stage of manufacture. Moreover, the detachable feature of the gib enables the guide to be readily replaced in the event of wear or serious damage.

The valve table 6 is provided with a slot 33 communicating with bore 9 which receives the piston stem 10. The piston stem 10 carries a stud, in this instance a screw 34, which projects above the face of the valve table 6, and engages in a hole or socket 35 in the underside of the reciprocatory pulsator valve 26. By this means the valve is detachably connected with the reciprocatory movement in unison therewith. The pulsator valve 26 rests loosely upon the valve surface 6 and is pressed thereon by atmospheric pressure only. That is to say when the underside of the valve and particularly the recess 26' is subjected to the suction or vacuum existing within the suction chamber 7, the atmosphere affords a preponderance of pressure upon the top of the valve, tending to hold it firmly to the seat upon the surface 6. The valve moving with the piston alternates the connection of the teat cup spuds 27 with the suction chamber 7. This to and fro movement of the pulsator valve is transmitted directly to the control valve to effect its alternation to in turn admit actuating fluid alternately to opposite sides of the piston head. To this end there are concentrically mounted upon the single pivotal stud 21, the control valve 20 heretofore mentioned, having therein the recess 21' forming the bypass or communicating passage between the ports 17 and 18 or 17 and 19, according to the position of the valve, an oscillatory valve carrier 36 having projecting from its under surface a stud 37, engaging in a hole 38 in the valve member 20. The hole 38 is somewhat larger than the stud or pin 37, affording a limited amount of play or independent movement between the carrier and valve. The bearing of the valve member 20 upon the pivotal stud 21 is likewise very free, so that the valve is capable of ready adjustment into conformity with the bearing surface 6 under the influence of atmospheric pressure. Above the valve carrier 36 is mounted an actuating plate 39, having therein the concentric arcuate slot 40, through which projects a stud 41, carried by the oscillatory valve carrier 36. The actuating plate 39 also carries a stud 42, and a coil spring 43 is provided one end of which is engaged with the stud 42 of the actuator plate, while the other end is engaged with the stud 41 of the valve carrier 36. The plate 39 is also provided with a dependent stud or pin 45, which engages in a notch or recess 44, in the top of the reciprocatory valve 26. Thus as the valve reciprocates under the influence of the piston, the actuator plate 39 is oscillated to and fro about the common pivotal stud 21.

The spring 43 is placed under compression by the alternating movement of the piston in either direction, and by its expansion as the piston reaches the limit of its stroke, the spring 43 operates to reverse the pivotal control valve. One end of the compression spring element 43 is pivotally connected to the stud 41, positioned eccentrically upon the oscillatory valve carrier 36 of the control valve 20. The other end of the compression spring is pivotally connected with the stud 42, which is shifted in unison with the reciprocation of the piston, to and fro past dead center relation with the opposite end of the spring, and pivotal center, about which the governing valve swings. As the piston advances in either direction, the pivotal connection of one end of the spring upon the stud 41 is carried with it, compressing the spring, until the spring connection has passed dead center relation with the center of oscillation of the governing valve, whereupon the expansion of the spring reverses the valve carrier 36 suddenly about the stud 21 carrying with it the valve 20, thus both ends of the compression spring 43 are shifted to and fro. One end of the spring moves to and fro in unison with the reciprocation of the piston. The other end of the spring moves to and fro in unison with the swinging movement of the governing valve. A movement of one end of the spring in unison with the piston serves to compress the spring, while the movement of the opposite end in unison with the swinging movement of the governing valve relieves the compression of the spring. The latter end of the spring 43 being eccentrically connected with the valve carrier, such reaction or expansion of the compressed spring effects the reversal of the control valve, whereby the parts assume the positions shown in Fig. 1, where the piston is at one limit of its stroke, and subsequently the position shown in Fig. 3, when the piston is at the opposite limit of its stroke. The movement of the valve 20 in either direction is limited by the engagement of the carrier 36 with a stud or pin 47, projecting from the valve table 6 and engaged by the carrier 36 at the opposite limits of its movement.

By this construction no locking is required to hold the valve 20 against movement until the piston reaches the limit of its stroke, but to the contrary the valve is held in one position by the actuating spring 43 until the opposite position of the piston is reached, whereupon the spring transmits a snap over action to the valve, without the intermediary of any form of locking or latching device. The speed of operation is controlled by means of a regulating screw 49, extending through the side wall of the pulsator body and intercepting the suction passage 17. By adjusting the screw to open or close the passage 17, the speed of operation may be increased or decreased at the will of the operator.

It is customary to provide an exhaust passage from the receiver or pail thru which a vacuum is induced within the receiver, to in turn induce a flow of milk from the teat cups. This suction or vacuum communication with the pail or receiver is ordinarily provided with a check valve, usually of the ball type. In the present instance, the pulsator is constructed to afford direct communication from the suction chamber 7 to the pail thru a valve port or passage 50, provided in a hub or neck 51 projecting upwardly from the cover 1, and controlled by a poppet valve 52. This valve 52 is gravity operated and is provided with a head 52ᵃ of greater diameter than hub or neck 51, whereby the margin of the head overhangs the seat formed upon the upper end of the neck or hub. The purpose of this is to prevent the entrance of moisture or condensation into the pail or receiver. It frequently happens that moisture or water of condensation collects upon the check valve, or milk spray may be drawn from the pail or receiver thru the exhaust passage 50, and condensed upon the valve. Such moisture and condensation is likely to drain back into the pail or receiver, when the ordinary form of check valve is employed. In the present instance, the extension of the valve head beyond its seat is sufficient to insure the drainage of such condensation over the outer edge of the seat and into the chamber 7 rather than thru the port 50, back into the pail or receiver. Thus the most cleanly and sanitary condition is maintained.

It is desirable during the period of operation to observe the flow of milk thru the milk tubes, from the respective clusters. By this means the operator is enabled to judge the condition of the cow and know when she has been completely stripped. It is quite the usual practice to provide a glass tube in the milk conduit, but such tube is difficult to keep clean and tends to collect milk intermediate the tube and rubber. In the present construction there is provided an observation window, removed from direct contact with the milk or proximity to the flow. It is usual to provide milk valves or cut offs in the lid or pail cover 1 at the point of entrance of milk tubes 53 thereto. These cut offs are usually a tapered oscillatory plug or valve member, seated in a corresponding opening with which the milk tube communicates. By turning such valve members to and fro, the milk conduit is opened and closed.

In the present instance, the lid 1 is provided with the usual bosses 54 with which the milk conduit spuds 53 communicate. These bosses are provided with tapered or conical bores, in which are seated the valve member 55. These valve members are tapered to correspond to the bore of the bosses 54, and are formed hollow or tubular with a lateral port or recess 55ᵃ, adapted when the valve member is turned to proper position to communicate with the milk conduit spud 53. The tops of the valve members 55 are counter-bored, as at 56, the margin of such counter-bore being inturned or internally flanged as at 57. Seated within this counterbore upon the shoulder 58 formed thereby, is first a rubber gasket or packing member 59, on which is seated a glass or other transparent disc 60. The disc 60 is retained in position by a split ring 61, of wire or other resilient material, having the outturned ends 62 and 63. One side of the counterbored portion of the valve member is formed with the undercut notch 64, in which the ends 62 and 63 of the ring 61 engage. The expansion of the ring 61 beneath the inturned flange 57 detachably retains the observation glass 60 in place. The end 63 of the ring 61 protrudes sufficiently to permit its easy engagement by the fingers of the operator, whereby the ring may be flexed or contracted to disengage it from beneath the overhanging flange or margin, thereby permitting ready removal of the glass for cleansing.

In Fig. 13 there is shown a modification of the milk valve and observation window where, in lieu of the combined window and milk valve shown in Figs. 9 and 10, and also in Fig. 1, these elements have been shown independently. The milk valve of ordinary type is shown at 66 in the spud 53, while the boss 54 is provided with a window or observation space 65 in the top thereof. In Figs. 14 and 15 this relation of independent milk valve and observation window has been reversed. In these figures, the milk valve is shown at 66′ seated in the boss 54 in the usual manner. A window observation space 67 is located in an enlargement 68 of the spud 53 in close relation to the boss 54. In both these modified constructions, the transparent window disc 65 and 67 is retained in position by the same means as illustrated in Figs. 9 and 10. This consists of the split wire ring 61, which is engaged under an overhanging flange 57 with the ends of the split ring in an undercut notch 64 before described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statutes the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a pulsator mechanism, an alternating pulsator valve, fluid pressure operated mechanism for alternating the valve, and an alternating control valve governing the action of the fluid pressure upon said mechanism, a valve carrier and an actuator mounted for relative movement about a common axis, a spring connecting said actuator and valve carrier, and tensioned by the approach of the said actuator toward a dead center position, the reaction of which serves to reverse the valve carrier, independent of further movement of the actuator, and means to oscillate the actuator.

2. In a pulsator mechanism, an alternating pulsator valve, fluid pressure operated mechanism for alternating the valve, and alternating control means governing an oscillatory valve member, an oscillatory actuator pivoted concentric with the valve, an actuating spring connecting the actuator and the valve member, the spring connections being movable to and fro past a dead center position by the oscillation of the actuator, and means for oscillating the actuator to tension the spring as it approaches a dead center position, the reaction of which upon passing the dead center position oscillates the valve member in a direction opposite to the direction of movement of the actuator to a reversed position.

3. In a pulsator mechanism, an alternating pulsator valve, fluid pressure operated mechanism for alternating the valve, an alternating control means governing the action of the fluid pressure upon said mechanism, including an oscillatory valve member and an actuator, both pivotally mounted for movement about a common axis, means for transmitting to the actuator, a uniform to and fro movement, and a spring, connected at one end to the actuator and at the opposite end to the valve member, the opposite ends of the spring being alternately movable each independent of the other, upon relative movement of the actuator and valve member, whereby the spring is tensioned by the movement of the actuator to reverse the valve member in advance of the travel of the actuator by the reaction of the tensioned spring.

4. In a pulsator mechanism, an alternating pulsator valve, fluid pressure operated mechanism for alternating the valve, and alternating control means governing the action of the fluid pressure upon said mechanism, including a valve member and an actuator therefor mounted for independent relative movement about a common axis, and a spring operatively connecting said members and movable to and fro across dead center positions by the relative movement of the actuator, whereby the tension of the spring holds the valve member against movement until the actuator passes a dead center position whereupon the reaction of the spring reverses the valve member.

5. In a pulsator mechanism, a reciprocatory fluid actuated piston, a pulsator valve, movable to and fro in unison with the movement of the piston and a control valve governing the action of the fluid pressure upon the piston and operatively connected with the pulsator valve whereby the control valve is directly dependent upon the pulsator valve for its movement, and a spring placed under tension by the movement of the pulsator valve for reversing the control valve at the limit of the pulsator valve stroke.

6. In a pulsator mechanism, a reciprocatory fluid actuated piston, a reciprocatory pulsator valve directly connected with the piston for unison movement therewith, an oscillatory control valve, an oscillatory actuator therefor pivoted concentrically with the oscillatory valve, a spring connecting the valve and actuator, and placed under tension by the movement of the actuator to subsequently oscillate the valve, and an operative engagement between the oscillator and the pulsator valve whereby the movement of the pulsator valve in unison with the piston is transmitted to the actuator.

7. In a pulsator, a cylinder, a piston therein, a valve table, a sliding valve thereon, said table having therein an opening through which the piston is interconnected with the valve, said opening being covered by the valve to prevent entrance therethru of air to the piston, a control governing the action of fluid pressure upon the piston and means to intermittently reverse said valve.

8. In a pulsator mechanism, a cylinder, a fluid actuated piston therein, a valve bearing surface, a valve slidingly adjustable thereon, and an operative connection between the piston and the underside of the valve and covered thereby substantially as specified.

9. In a pulsator mechanism, a cylinder, a fluid pressure actuated piston therein, a valve table located at one end of the cylinder, the valve table having therein beneath its surface, a bore communicating with the cylinder, a piston stem extending within said bore, ports in said table, a valve slidable upon said table controlling the ports, the table provided with a slot communicating with the bore and normally closed by the valve in its different positions of adjustment, and an operative connection from the piston stem to the valve projecting through said normally closed slots.

10. In a pulsator mechanism, a cylinder, a piston therein comprising two relatively adjustable heads having convergently tapered peripheries forming a variable V shaped groove, an annular packing ring seated in said groove and capable of being expanded into variable contact with the cylinder walls by the relative adjustment of the heads, a pulsator valve operated by the movement of the piston and a control valve governing the action of fluid pressure upon the piston and means to reverse the control valve as the piston approaches the limit of its stroke.

11. A pulsator mechanism of the type wherein a pulsator valve is alternated by the reciprocation of a fluid actuated piston, the action of the fluid pressure thereon being governed by a control valve reversible as the piston approaches the limit of its stroke, characterized by a head for said piston comprising two relatively adjustable discs having inwardly converging tapered peripheries, an annular packing ring intermediate the tapered peripheries and means to maintain the discs in differently adjusted relations whereby the annular packing ring will be expanded to greater or less degree.

12. A pulsator mechanism of the type wherein a pulsator valve is alternated by the reciprocation of a fluid actuated piston, the action of the fluid pressure thereon being governed by a control valve reversible as the piston approaches the limit of its stroke, characterized by an expansible packing ring for the piston head and means for adjusting the packing ring to vary the resistance of the piston to the actuating fluid pressure.

13. A mounting for a pulsator mechanism of the type wherein a pulsator valve is alternated by the reciprocation of a fluid actuated piston, the action of the fluid pressure thereon being governed by a control valve reversible as the piston approaches the limit of its stroke, characterized by a supporting structure including a cylinder in which the piston reciprocates, a shelf contiguous to one end of the cylinder, beneath which the stem of the piston projects, said shelf receiving thereon a slidably mounted valve, and having therein an elongated opening hermetically closed by the valve upon the table in all positions of adjustment thereof, through which hermetically closed opening, the piston stem and valve are interconnected wholly beneath said valve.

14. A mounting for a pulsator mechanism of the type wherein a pulsator valve is alternated by the reciprocation of a fluid actuated piston, the action of the fluid pressure thereon being governed by a control valve reversible as the piston approaches the limit of its stroke, characterized by a supporting structure, within which the piston reciprocates, a valve table formed upon the supporting structure upon which the pulsator valve is slidably mounted, said table having therein an elongated opening hermetically closed by the valve in all positions of adjustment of the valve, and through which an operative coupling interconnects the valve and piston wholly beneath the valve.

15. A mounting for a pulsator mechanism of the type wherein a pulsator valve is alternated by the reciprocation of a fluid actuated piston, the action of the fluid pressure thereon being governed by a control valve reversible as the piston approaches the limit of its stroke, characterized by a housing comprising a suction chamber, the top of which forms a valve table upon which said valves have sliding bearings, and a horizontally disposed cylinder intersecting the suction chamber at one side thereof with its axis approximately on level with said valve table.

16. A mounting for a pulsator mechanism of the type wherein a pulsator valve is alternated by the reciprocation of a fluid actuated piston, the action of the fluid pressure thereon being governed by a control valve reversible as the piston approaches the limit of its stroke, characterized by a housing comprising a suction chamber and a cylinder intersecting each other in offset relation whereby the terminal walls of said chamber and cylinder form a reentrant angle, one face of which forms a bearing for said valves.

17. In a pulsator mechanism, a reciprocatory piston, an alternating pulsator valve loosely coupled thereto and reciprocating in unison therewith, an oscillatory control valve governing the action of fluid pressure upon the piston, a spring for said oscillatory control valve placed under compression by the advance of the piston in alternate directions, and adapted by its expansive reaction to actuate the oscillatory control valve first in one direction and then in the other to alternate the fluid pressure upon the opposite sides of the piston.

18. In a pulsator mechanism, a reciprocatory piston, a pulsator valve connected thereto and reciprocated to and fro in unison with the reciprocation of the piston, an alternating control valve governing the action of the fluid pressure upon the piston, an oscillatory carrier for the control valve, a compression spring element having one end connected eccentrically to said oscillatory valve carrier, the other end of the spring element being movable to and fro past dead center relation with the pivotal center of the control valve carrier in unison with the reciprocation of the piston, the movement of the piston in one direction and then in the other serving to place said spring element under compression, the reaction of which, as the piston operated end of the spring element passes such dead center position, serves to reverse the control valve.

19. In a pulsator mechanism, a cylinder, a reciprocatory fluid pressure operated piston therein, an alternating control valve for the fluid pressure, a compression spring pivotally connected at its opposite ends and movable to and fro about its pivotal connections in unison with the movement of the piston to compress the spring first in one direction and then in the other, the expansive reaction of the spring as the spring reaches the limit of its stroke in either direction serving to reverse the control valve to direct the actuating fluid pressure to the opposite side of the piston, and a pulsator valve also controlled by the movement of the piston.

20. In a pulsator mechanism, an alternating pulsator valve, fluid pressure operated means for alternating the valve, and alternating control means governing the action of the fluid pressure upon said mechanism, including an alternating control valve, an actuating spring for said valve, means for tensioning said spring by the operation of said fluid pressure operated mechanism by which the spring is caused to exert its influence to hold said valve against reversal independent of other stop means until the fluid pressure actuated mechanism reaches a predetermined stage in its cycle of operation whereupon the control valve will be reversed by the reaction of the tensioned spring.

21. In a pulsator mechanism, an alternating pulsator valve, fluid pressure operated means for alternating the valve, and alternating control means governing the action of the fluid pressure upon said mechanism, including a valve member and an actuator, each movable independent of and in relation with the other, a spring connected at one end to the actuator and at the other end to the valve member, the opposite ends of the spring being alternately movable with the respective members to which they are connected, the spring being tensioned by the movement of the actuator to temporarily restrain the movement of the valve member independent of other stop means until the fluid pressure operated mechanism reaches a predetermined stage in its cycle of operation.

22. In a pulsator mechanism, an alternating pulsator valve, fluid pressure operated means for alternating the valve, and alternating control means governing the action of the fluid pressure upon said mechanism, including a movable actuator and a movable valve member each movable to and fro independently of the other throughout a predetermined range of movement, a spring connected to the actuator and also connected to the valve member, the opposite ends of which are relatively movable with the respective attached members, the range of movement of the spring connection with the actuator being slightly greater than that of the spring connection with the valve member whereby the spring connection with the actuator will pass beyond the position of the spring connection with the valve at the opposite limits of its movement, the construction being such that the spring will exert its tensioned influence against the valve member to hold said valve member against reversal until the actuator moves beyond the connection of the spring with the valve whereupon the direction of tensioned influence of the spring being changed the valve will be reversed by the reaction of the spring.

23. In a pulsator mechanism, an alternating pulsator valve, fluid pressure operated means for alternating the valve, and alternating control means governing the action of the fluid pressure upon said mechanism, including a pivoted valve member and a pivoted actuator, each capable of oscillatory movement independent of the other, a spring connected at one end to the oscillatory valve member and connected at its opposite end to the oscillatory actuator, the range of movement of the connection point of the spring with the actuator being greater than that of the point of connection of the spring with the valve member whereby the spring connection with the actuator will move beyond a dead center relation with the spring connection of the valve member, the construction being such that the spring tensioned by the movement of the actuator will exert its tensioned influence to hold the valve against reversal independent of other stop means until the spring connection with the actuator passes a dead center relation whereupon the reaction of the spring will effect the reversal of the valve member.

24. In a pulsator mechanism, an alternating pulsator valve, fluid pressure operated means for alternating the valve, and alternating control means governing the action of the fluid pressure upon said mechanism, including an alternating valve member and an alternating actuator both capable of to and fro movement independent of the other, one of said members being pivoted for oscillatory to and fro movement, a spring connecting said members, the range of movement of the respective members being so limited that the spring connection with the actuator will cross a dead center relation with the center of oscillation of the pivoted member and the point of connection of the spring with the valve member as the actuator approaches the limit of its stroke in either direction, whereby the spring will be tensioned to hold the valve against movement independent of other stop means until the said dead center relation is passed whereupon the reaction of the spring will reverse said valve.

25. A mounting for a pulsator mechanism wherein a reciprocatory piston actuates a pulsator valve under control of a reversible governing valve, comprising an integral unitary body having therein a suction chamber and a piston chamber arranged in offset relation with their axes substantially at right angles one to the other in a common plane, the terminal head of the suction chamber being approximately coincident with the axis of the piston chamber and forming a valve table for the pulsator and governing valves which are actuated by the piston within the piston chamber.

26. In a pulsator mechanism, a cylinder, a reciprocatory fluid actuated piston therein, a movable control valve for the fluid pressure, a compression spring, one end of which is movable to and fro in unison with the movement of the control valve, the other end of which is movable to and fro in unison with the movement of the piston, the spring being compressed by its unison movement with the piston and relieved by its unison movement with the control valve, such latter movement serving to reverse the control valve to admit fluid pressure to the opposite side of the piston, and a pulsator valve also controlled by the movement of the piston.

27. In a pulsator mechanism, a fluid pressure operated prime mover, a reversible control valve governing the action of the fluid pressure upon the prime mover, a compression spring, one end of which is movable to and fro to alternate positions in unison with the movement of the prime mover and the other end of which is movable to and fro to alternate positions in unison with the movement of the control valve, said spring being placed under compression by the movement of the prime mover in either direction, and likewise relaxed by the movement of the governing valve in either direction, such relaxation of the spring serving to actuate the valve first in one direction and then in the other, and a pulsator valve also governed by the prime mover.

28. In a pulsator mechanism, a fluid pressure chamber, a fluid pressure actuated piston therein, a movable control valve governing the action of the fluid pressure upon the piston, a carrier for said valve movable to and fro to alternate positions, a compression spring pivotally connected at one end to the valve carrier, the opposite end of the compression spring being pivotally connected for to and fro movement in unison with the movement of the piston, the movement of the piston in either direction serving to compress the spring, the expansive reaction of the spring first in one direction and then in the other to which the spring is turned by its to and fro movement in unison with the piston serving to actuate the control valve in alternate directions.

In testimony whereof, I have hereunto set my hand this 25th day of August, A. D. 1921.

JOHN ANTON SCHMITT.